(12) United States Patent
Medick

(10) Patent No.: US 9,262,884 B1
(45) Date of Patent: Feb. 16, 2016

(54) SYSTEM AND METHOD FOR EVALUATING GAMING MACHINES

(71) Applicant: James T. Medick, Las Vegas, NV (US)

(72) Inventor: James T. Medick, Las Vegas, NV (US)

(*) Notice: Subject to any disclaimer, the term of this patent is extended or adjusted under 35 U.S.C. 154(b) by 527 days.

(21) Appl. No.: 13/717,192

(22) Filed: Dec. 17, 2012

(51) Int. Cl.
*G06Q 30/00* (2012.01)
*G07F 17/32* (2006.01)
*G06Q 30/02* (2012.01)

(52) U.S. Cl.
CPC .......... *G07F 17/32* (2013.01); *G06Q 30/02* (2013.01); *G06Q 30/0201* (2013.01); *G06Q 30/0203* (2013.01); *G06Q 30/0209* (2013.01); *G06Q 30/0217* (2013.01); *G06Q 30/0245* (2013.01); *G07F 17/3248* (2013.01); *G07F 17/3262* (2013.01)

(58) Field of Classification Search
CPC . G07F 17/32; G07F 17/3248; G07F 17/3262; A63F 13/12; A63F 13/79; H04H 60/33; G06Q 30/0201; G06Q 30/02; G06Q 30/0613; G06Q 30/0203; G06Q 30/0245; G06Q 30/0217; G06Q 30/0209
See application file for complete search history.

(56) References Cited

U.S. PATENT DOCUMENTS

| | | | |
|---|---|---|---|
| 7,765,245 B2* | 7/2010 | Nichols et al. | 707/825 |
| 2003/0100359 A1* | 5/2003 | Loose et al. | 463/20 |
| 2007/0050256 A1* | 3/2007 | Walker et al. | 705/14 |
| 2013/0203485 A1* | 8/2013 | Walker et al. | 463/25 |

OTHER PUBLICATIONS

Jerry W. Thomas, "The secrets of good product testing", Nov. 1993, quirks.com, <http://www.quirks.com/articles/a1993/19931102.aspx?searchID=207577257>.*

* cited by examiner

*Primary Examiner* — Justin Myhr
(74) *Attorney, Agent, or Firm* — One3 IP Management, P.C.; Justin G. Sanders; Jeromye V. Sartain

(57) ABSTRACT

A system and method for facilitating the evaluation of a prototype gaming machine by an at least one respondent provides, in the exemplary embodiment, a gaming room containing the prototype gaming machine and an at least one alternative gaming machine. Each respondent is provided with an equal number of play credits to be selectively used in the prototype and alternative machines in lieu of actual money. A game play session is commenced, during which time the respondents are able to freely and selectively interact with each of the prototype and alternative machines. Upon conclusion of the game play session, the number of credits accumulated by each respondent during the game play session are calculated and the respondents are ranked accordingly. Prizes are subsequently awarded to each of the respondents based on their respective rankings, and a survey is conducted with respect to each respondent's opinion of the prototype gaming machine.

20 Claims, 2 Drawing Sheets

SYSTEM AND METHOD FOR EVALUATING GAMING MACHINES

RELATED APPLICATIONS

Not applicable.

INCORPORATION BY REFERENCE

Applicant(s) hereby incorporate herein by reference any and all U.S. patents and U.S. patent applications cited or referred to in this application.

BACKGROUND OF THE INVENTION

1. Field of the Invention

Aspects of this invention relate generally to survey methods, and more particularly to a system and method for evaluating gaming machines that is configured for facilitating the collection of accurate feedback with respect to respondents' opinions, both conscious and unconscious, of the gaming machines.

2. Description of Related Art

The following art defines the present state of this field:

Like many goods and services, slot machines and other types of gambling machines—hereinafter simply referred to generally as "gaming machines"—are often put through market research testing before they are made available for public use. Traditionally, the evaluation of a gaming machine has simply involved allowing a select group of respondents the opportunity to play the machine in a controlled environment, oftentimes without any other machines to test it against, and then rate the machine on an absolute scale. As such, that scale would tend to vary dramatically based on the relative experience and habits of each respondent.

Additionally, traditional gaming machine evaluation methods have allowed respondents to use free credits—rather than their own money—to play the machine, and similarly failed to provide the respondent with any payouts; instead, the respondent being asked to simply play the machine for the sole purpose of rating the game play. As such, this form of evaluation has tended to reduce the respondent's stake, or real interest, in the game play and has ultimately caused the respondent's opinion of the machine to be based on less than realistic factors.

Thus, there remains a need in the field of gaming machine evaluation for a system and method that assists in eliciting a more accurate consumer opinion on machines that are being evaluated. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the problems described above by providing a system and method for facilitating the evaluation of a prototype gaming machine by an at least one respondent. The system provides, in the exemplary embodiment, a gaming room configured to resemble a casino floor so as to provide a realistic gaming atmosphere for the at least one respondent. The prototype gaming machine is positioned within the gaming room, along with an at least one alternative gaming machine; the alternative gaming machine being different from that of the prototype gaming machine for providing the at least one respondent an alternative machine with which to selectively interact during evaluations. An at least one video camera is positioned within the gaming room and configured for recording the visual behavior of the at least one respondent, while interacting with the prototype gaming machine. Similarly, an at least one microphone is positioned within the gaming room and configured for recording the audible behavior of the at least one respondent. A computing device is interconnected with and configured for receiving and processing the data captured by each of the prototype gaming machine, the at least one alternative gaming machine, the at least one video camera, and the at least one microphone.

As for the method of facilitating the evaluation of the prototype gaming machine, with each of the prototype and at least one alternative gaming machine positioned within the gaming room, at least one embodiment of such a method includes providing each respondent with an equal number of play credits to be selectively used in the prototype and alternative gaming machines in lieu of actual money; each of the gaming machines being configured for requiring a pre-determined number or range of credits per play and similarly rewarding the respondents with additional credits for wins. A game play session is commenced, during which time the respondents are able to freely and selectively interact with each of the prototype gaming machine and the at least one alternative gaming machine. The game play session lasts for a pre-determined period of time and is subsequently concluded. The computing device calculates the number of credits that were accumulated by each respondent during the game play session and then ranks the respondents accordingly. Prizes are awarded to each of the respondents based on their respective rankings. Additionally, a survey is conducted with respect to each respondent's conscious opinion of the prototype gaming machine.

Thus, with the at least one respondent selectively interacting with each of the prototype and alternative gaming machines during an evaluation session, the present system and method is capable of simulating a realistic casino environment, thereby facilitating the collection of accurate feedback with respect to the at least one respondent's opinion, both conscious and unconscious, of the prototype gaming machine.

A primary objective inherent in the above described system and method of use is to provide advantages not taught by the prior art.

Another objective is to provide such a system and method that is configured for facilitating the collection of realistic feedback with respect to the gaming machines being evaluated.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

Figure 1:
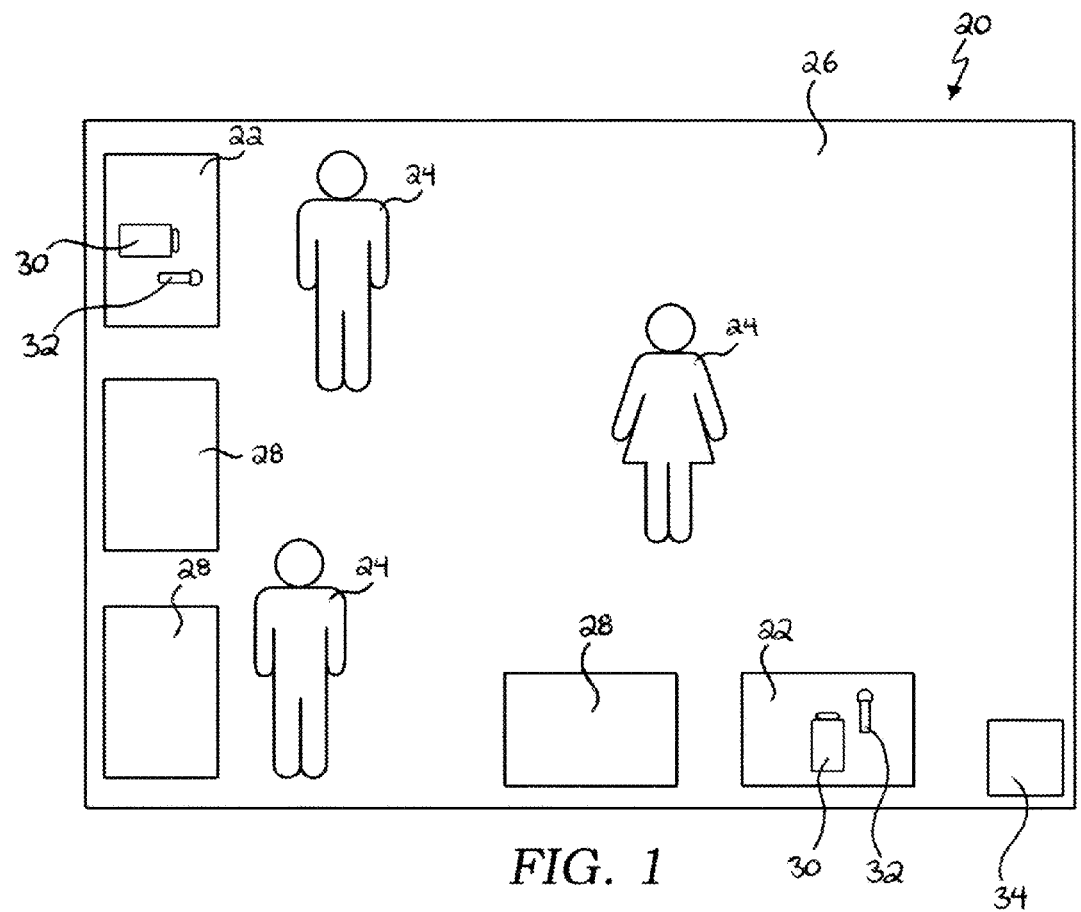
FIG. 1 is a schematic view of an exemplary system for facilitating the evaluation of a gaming machine, in accordance with at least one embodiment.

Turning now to FIG. 1, there is shown a schematic view of an exemplary system 20 for facilitating the evaluation of a prototype gaming machine 22 (hereinafter "prototype machine") by an at least one respondent 24, in accordance with at least one embodiment. In the exemplary embodiment, the system 20 comprises a gaming room 26 configured to resemble a real casino floor so as to provide a realistic gaming atmosphere for the respondents 24 during the evaluations. The prototype machine 22 is positioned within the gaming room 26 along with an at least one alternative gaming machine 28 (hereinafter "alternative machine"). It should be noted that, in at least one embodiment, multiple units of the prototype machine 22 may be positioned within the gaming room, depending on the number of respondents 24 participating. The at least one alternative machine 28 is a different machine from that of the prototype machine 22, in order to provide the at least one respondent 24 a different machine with which to selectively interact during the evaluations should the respondent 24 so choose, as discussed further below. Additionally, the at least one alternative machine 28 preferably has a known success rate—either through prior evaluations of the alternative machine 28 or proven success in public use—so as to allow for clearer assessments based on respondent comparisons between the prototype machine 22 and alternative machines 28. For example, if the alternative machine 28 has a relatively low success rate, yet the respondents 24 tend to favor use of the alternative machine 28 over the prototype machine 22 during evaluations, such a scenario would tend to demonstrate a relatively low opinion rating for the prototype machine 22.

With continued reference to FIG. 1, the system 20 further provides, in at least one embodiment, an at least one video camera 30 positioned within the gaming room 26 and configured for recording the visual behavior of the at least one respondent 24 while interacting with the prototype machine 22 during evaluations. Preferably, the at least one video camera 30 is positioned on, or at least proximal to, the prototype machine 22 so as to capture both the respondent's facial expressions as well as their body language. Additionally, in at least one embodiment, the system 20 provides an at least one microphone 32 positioned within the gaming room and configured for recording the audible behavior of the at least one respondent 24 while interacting with the prototype machine 22 during evaluations. Preferably, the at least one microphone 32 is positioned on, or at least proximal to, the prototype machine 22 so as to accurately capture any audible noises created by the respondent 24. The purpose of the at least one video camera 30 and microphone 32 is discussed further below. In further embodiments, the at least one video camera 30 and microphone 32 are positioned for recording the visual and audible behaviors of the at least one respondent 24 while interacting with the at least one alternative machine 28 during evaluations as well.

With continued reference to FIG. 1, the system 20 further provides, in at least one embodiment, a computing device 34 positioned either within or somewhere remote from the gaming room 26. The computing device 34 is interconnected with and configured for receiving and processing play data from each of the prototype machine 22 and the at least one alternative machine 28. As discussed further below, the play data may include, but is not limited to, the number of times the respondent 24 plays each machine 22 and 28, the amount of time the respondent 24 spends playing each machine 22 and 28, the number of credits bet or played by the respondent 24 on each machine 22 and 28, and the number of credits won by the respondent 24 on each machine 22 and 28. Additionally, the computing device 34 is interconnected with and configured for receiving the respondent's 24 visual and audible behaviors as captured by each of the at least one video camera 30 and microphone 32, respectively.

Figure 2:
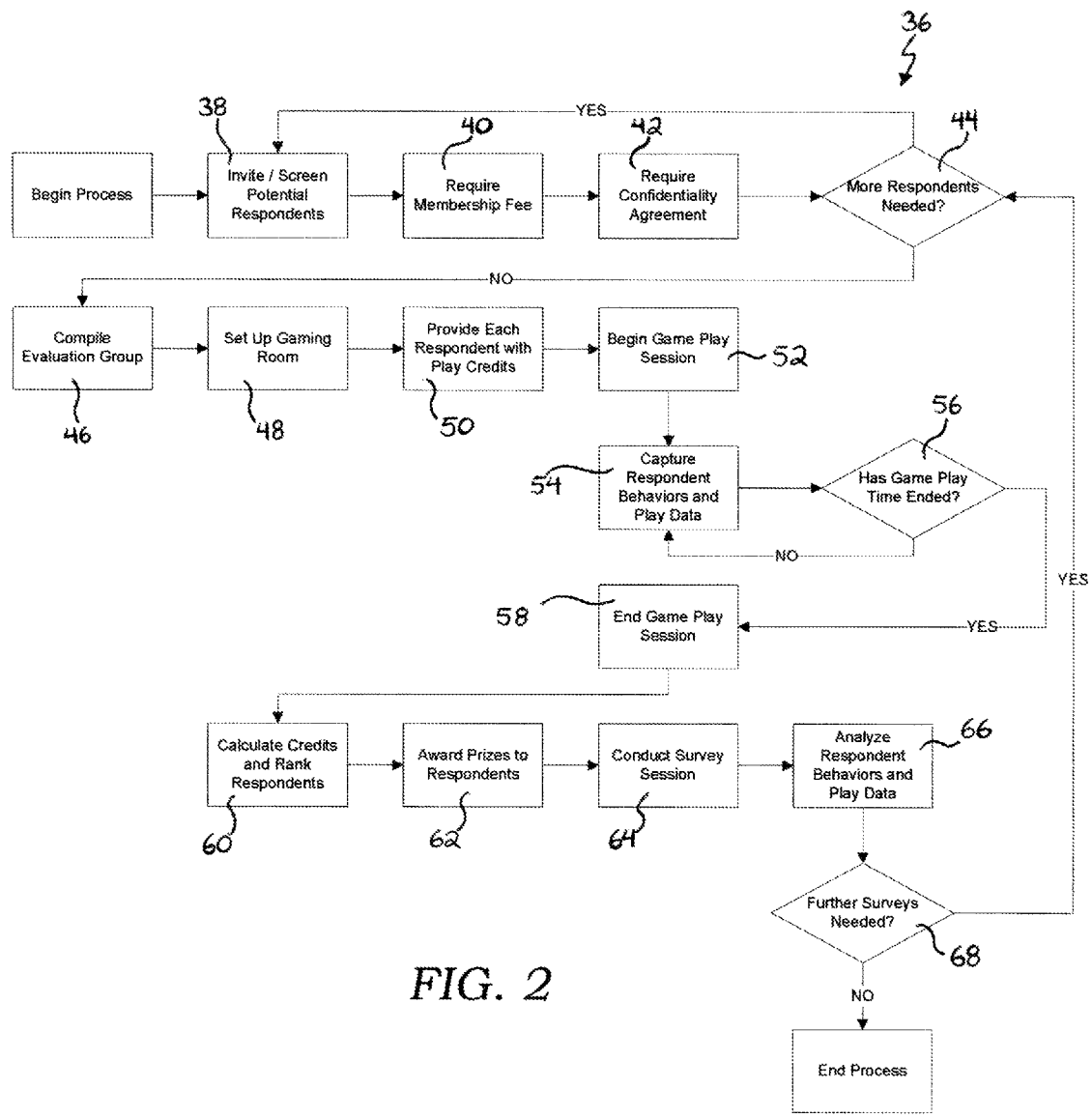
FIG. 2 is a flow diagram illustrating an exemplary method of evaluating a gaming machine, in accordance with at least one embodiment.

Turning now to FIG. 2, there is shown a flow diagram illustrating an exemplary method 36 for evaluating the prototype machine 22 by the at least one respondent 24, in accordance with at least one embodiment. In the exemplary embodiment, at step 38, potential respondents 24 are first invited to become members of the evaluation system 20, and are subsequently interviewed and screened for gaming machine experience so that they may be categorized based on experience and game preferences—i.e., video slots, stepper slots, premium games, etc. At step 40, upon being accepted as a member, each respondent 24 is required to pay a membership fee. The purpose of requiring a membership fee is to ensure that the respondents 24 are serious about providing feedback on the prototype machine 22, while also creating a vested interest in each respondent 24 in playing the machines 22 and 28 in a manner that would provide them with the biggest payout possible. In other words, the membership fee requirement assists in creating a realistic casino atmosphere to better ensure the eliciting of accurate feedback with respect to the prototype machine 22. In the exemplary embodiment, the membership fee is $250 per year; however, in further embodiments, the membership fee may be any dollar amount—whether a recurring fee or a one-time fee—deemed sufficient to create a vested interest in each respondent 24.

In at least one embodiment, shown as step 42, each respondent 24 is further required to execute a confidentiality agreement designed to prevent them from disclosing the details of the prototype machine 22 or the details of the system 20 or method 36 used to evaluate the prototype machine 22.

With continued reference to FIG. 2, upon inviting and enrolling a sufficient number of respondents 24 (step 44), an evaluation session is then set up. In a bit more detail, in at least one embodiment, at step 46, an evaluation group is compiled from the enrolled respondents 24. Preferably, the evaluation group consists of no more than ten (10) respondents 24; though, in further embodiments, the evaluation group may consist of any number of respondents 24. Additionally, in at least one embodiment, respondents 24 are chosen for the evaluation group based on various factors, including but not limited to the number of prior evaluations a respondent 24 has participated in (to better ensure that a particular respondent 24 has not participated in so many evaluations as to become a "professional respondent," which could result in less than accurate feedback on the prototype machine 22), the relative gaming machine experience of a respondent 24, and a respondent's 24 game preferences. At step 48, upon compiling an evaluation group, the gaming room 26 is set up and configured to resemble a casino floor with the at least one prototype machine 22, along with the at least one alternative machine 28, being positioned in the gaming room 26.

At step 50, each respondent 24 in the evaluation group is provided with an equal number of play credits to be selectively used in the prototype and alternative machines 22 and 28. The play credits are intended to mimic and be used in lieu of actual money, so that actual money does not have to be used or gambled during the evaluations. As such, each of the prototype and alternative machines 22 and 28 require a pre-determined number or range of credits for each play of the machines 22 and 28. Similarly, rather than paying out actual money, each of the prototype and alternative machines 22 and 28 pays out credits, the amount of which is dependent upon the rules employed by the machines 22 and 28 and the number of credits being played by the respondents 24.

At step 52, a game play session begins, during which time the respondents 24 are allowed to freely and selectively interact with each of the prototype and alternative machines 22 and 28 at their discretion. As mentioned above, rather than playing with actual money, respondents 24 play—i.e., bet—with credits that are given to them as part of their participation in the evaluation. Respondents 24 may use these credits to play the machines 22 and 28 in an effort to receive even more credits. This is further incentivized by the awarding of prizes upon the conclusion of the game play session, as discussed further below. Certainly, while respondents 24 may win additional credits by playing the machines 22 and 28, they may also lose credits, or ultimately break even—just like in a real casino. In at least one embodiment, should a respondent 24 lose all of their credits with time still remaining in the game play session, they may be provided with the option of receiving additional credits—though, deductions would ultimately be made for such additional credits received when it comes time to award prizes upon the conclusion of the game play session. During the game play session, respondents 24 may choose to spend their entire time with the prototype machine 22, or they may choose to spend their entire time with the at least one alternative machine 28 (if, for example, they feel they are not "winning" with the prototype machine 22), or they may choose to divide their time between each—again, just like in a real casino. Additionally, while playing the machines 22 and 28, respondents 24 are able to selectively vary their bets—i.e., number of credits played—as desired. Furthermore, at any point during the game play session, a respondent 24 may choose to stop playing altogether. In other words, the presence of prizes (as discussed further below) for incentivizing respondents 24 to play the machines 22 and 28 so as to win as many credits as possible, and the ability for respondents 24 to selectively play the machines 22 and 28 at their discretion creates a realistic casino environment which, in turn, facilitates the collection of realistic feedback with respect to the prototype machine 22.

At step 54, in at least one embodiment, the visual and audible behaviors of each respondent 24 during the game play session are captured by each of the at least one video camera 30 and microphone 32 positioned within the gaming room 26, and are transmitted to the computing device 34. Such behaviors—including but not limited to respondent 24 body language, facial expressions, tone of voice and content of speech—can be used to further illuminate a respondent's 24 conscious or unconscious opinion of the prototype machine 22. The play data from each of the prototype machine 22 and the at least one alternative machine 28—including but not limited to the number of times the respondent 24 plays each machine 22 and 28, the amount of time the respondent 24 spends playing each machine 22 and 28, the number of credits bet by the respondent 24 on each machine 22 and 28, and the number of credits won by the respondent 24 on each machine 22 and 28—is also transmitted to the computing device 34.

Upon the passing of a pre-determined period of time (step 56), at step 58, the game play session is ended. In the exemplary embodiment, the period of time is two and one-half (2½) hours, so as to ensure that each respondent 24 will have enough time to fully interact with the prototype machine 22 as they may desire. However, in further embodiments, the period of time may be any amount of time deemed sufficient to provide enough of an opportunity for each respondent 24 to adequately interact with the prototype machine 22—dependent, in part, on the number of respondents 24 in the evaluation group and the relative complexity of the prototype machine 22.

At step 60, upon conclusion of the game play session, the computing device 34 calculates the number of credits that were accumulated by each respondent 24 during the session, and then ranks the respondents 24 from highest number of credits to lowest number of credits. At step 62, prizes are awarded to each of the respondents 24, the relative value of said prizes being directly proportionate to the relative ranking of each respondent 24—i.e., the top ranked respondent 24 (or group of respondents 24) receiving a prize having the relatively highest value, all the way down to the bottom ranked respondent 24 (or group of respondents 24) receiving a prize having the relatively lowest value. For example, in at least one embodiment, where the evaluation group consists of ten (10) respondents 24, the top ranked respondent 24 would be awarded $800, the next highest ranked respondent 24 would be awarded $700, the next highest ranked respondent 24 would be awarded $600, the next highest ranked respondent 24 would be awarded $500, the next highest ranked respondent 24 would receive $400, and the remaining respondents 24 would each receive a free dinner. Certainly, in further embodiments, any other prizes (both type and value) and associated award structures, now known or later conceived, may be substituted. In this way, respondents 24 are encouraged to try and win the most credits possible during the game play session so as to increase their chances of winning a relatively higher-valued prize.

At step 64, upon the awarding of prizes, a survey session is conducted, during which time each respondent 24 is probed regarding their experience with, and opinion of, the prototype machine 22 during the game play session. In the exemplary embodiment, the survey session is conducted with the evaluation group as a whole via a moderator led focus group; however, in alternate embodiments, the survey session may be conducted with one respondent 24 at a time. The questions asked of each respondent 24 during the survey session may include, but are not limited to, the respondent's 24 overall reaction to the prototype machine 22, the relative appeal of the prototype machine 22, the prototype machine's 22 concept and/or subject matter, the visual display of the prototype machine 22, the sound effects emitted by the prototype machine 22, the level of action created by the prototype machine 22, the respondent's 24 learning curve with respect to the prototype machine 22 (i.e., how long it took the respondent 24 to fully grasp the prototype machine's 22 rules and game play, if at all), comparisons to other games/machines played by the respondent 24, what the respondent 24 liked about the prototype machine 22, what the respondent 24 disliked about the prototype machine 22, how the respondent 24 felt about any bonus action the prototype machine 22 may have offered, whether the symbols and buttons on the prototype machine 22 were easily understood, etc. It should be noted that step 64 may, in at least one embodiment, be carried out prior to step 62, should the awarding of prizes prior to conducting the survey be viewed as possibly tainting the respondents' 24 opinion of the prototype machine 22.

At step 66, the analytics of the survey results for each respondent 24 are matched to the video and audio recordings of the respondent's 24 game play session, along with the associated play data, thereby enabling an analysis of the survey results of each respondent 24 against the recorded interactions between said respondent 24 and the prototype machine 22. As mentioned above, this allows for a more comprehensive evaluation of the prototype machine 22 by factoring in both the respondent's 24 conscious and unconscious feedback.

The above described method may be repeated multiple times for a given prototype machine 22, each time with an evaluation group consisting of new respondents 24—i.e., respondents 24 who have not yet evaluated the prototype machine 22—as needed (step 68). In the exemplary embodiment, the total number of game play and survey sessions (generally, evaluation sessions) to be conducted is dependent, at least in part, upon the stage of development that the prototype machine 22 is in.

To summarize, regarding the exemplary embodiments of the present invention as shown and described herein, it will be appreciated that a system and method for evaluating gaming machines is disclosed and configured for facilitating the collection of accurate feedback with respect to respondents' opinions, both conscious and unconscious, of the gaming machines. Because the principles of the invention may be practiced in a number of configurations beyond those shown and described, it is to be understood that the invention is not in any way limited by the exemplary embodiments, but is generally directed to a system and method for evaluating gaming machines and is able to take numerous forms to do so without departing from the spirit and scope of the invention. Furthermore, the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for facilitating the evaluation of a prototype gaming machine by an at least one respondent, the method comprising the steps of:
   positioning the prototype gaming machine in a gaming room;
   positioning an at least one alternative gaming machine in the gaming room, the alternative gaming machine being different from that of the prototype gaming machine, for providing the at least one respondent an alternative machine with which to selectively interact;
   positioning an at least one video camera in the gaming room, the at least one video camera configured for capturing the visual behavior of the at least one respondent while the at least one respondent interacts with at least one of the prototype gaming machine and the at least one alternative gaming machine;
   positioning an at least one microphone in the gaming room, the at least one microphone configured for capturing the audible behavior of the at least one respondent while the at least one respondent interacts with at least one of the prototype gaming machine and the at least one alternative gaming machine;
   implementing a computing device in communication with each of the prototype gaming machine, at least one alternative gaming machine, at least one video camera and at least one microphone, the computing device configured for receiving and processing data related to the prototype gaming machine, the at least one alternative gaming machine and the at least one respondent;
   providing each of the at least one respondent with an equal number of play credits to be selectively used in the prototype and alternative gaming machines in lieu of actual money, each of the gaming machines configured for requiring a pre-determined number or range of credits per play and similarly rewarding the at least one respondent with additional credits for wins;
   commencing a game play session, during which time the at least one respondent is able to freely and selectively interact with each of the prototype gaming machine and the at least one alternative gaming machine, the game play session to last for a pre-determined period of time;
   the computing device receiving the captured visual and audible behavior of the at least one respondent from the at least one video camera and microphone;
   the computing device receiving play data from the prototype gaming machine and the at least one alternative gaming machine, said play data including at least one of a number of times each of the at least one respondent plays each of the prototype gaming machine and at least one alternative gaming machine, an amount of time each of the at least one respondent spends playing each of the prototype gaming machine and at least one alternative gaming machine, a number of credits bet by each of the at least one respondent on each of the prototype gaming machine and at least one alternative gaming machine, and a number of credits won by each of the at least one respondent on each of the prototype gaming machine and at least one alternative gaming machine; and
   upon the passing of the pre-determined period of time:
      concluding the game play session;
      the computing device obtaining conscious opinion of the prototype gaming machine from each of the at least one respondent;
      the computing device determining an unconscious opinion of the prototype gaming machine from each of the at least one respondent based on at least one of the visual behavior of said at least one respondent, the audible behavior of said at least one respondent, and the play data associated with said at least one respondent; and
      the computing device adjusting the conscious opinion of each of the at least one respondent based on the corresponding unconscious opinion of said at least one respondent;
   whereby, the method is capable of facilitating the collection of accurate feedback with respect to each of the at least one respondent's opinion of the prototype gaming machine.

2. The method of claim 1, further comprising the steps of:
   inviting the at least one respondent to participate in the evaluation of the prototype gaming machine; and
   interviewing and categorizing the at least one respondent based on gaming machine experience and game preferences.

3. The method of claim 1, further comprising the step of requiring each of the at least one respondent to pay a membership fee so as to better ensure that said at least one respondent is serious about interacting with and evaluating the prototype gaming machine.

4. The method of claim 1, further comprising the step of requiring each of the at least one respondent to execute a confidentiality agreement designed to prevent said at least one respondent from disclosing the details of the prototype gaming machine or the details of the evaluation.

5. The method of claim 1, further comprising the step of compiling an evaluation group consisting of no more than ten respondents.

6. The method of claim 1, wherein the step of commencing a game play session further comprises the step of allowing the at least one respondent to stop playing at any point during the game play session.

7. The method of claim 1, wherein the step of commencing a game play session further comprises the step of providing the at least one respondent with the option of receiving additional credits upon said at least one respondent losing all of their credits with time still remaining in the game play session.

8. The method of claim 1, wherein the step of obtaining a conscious opinion of the prototype gaming machine from each of the at least one respondent further comprises the step of conducting a moderator led focus group with the respondents.

9. The method of claim 1, further comprising the steps of, upon the passing of the pre-determined period of time:
calculating the number of credits that were accumulated by each of the at least one respondent during the game play session;
ranking the at least one respondent by number of credits accumulated during the game play session; and
awarding prizes to each of the respondents based on their respective rankings.

10. A method for facilitating the evaluation of a prototype gaming machine by an at least one respondent, the method comprising the steps of:
positioning the prototype gaming machine in a gaming room;
positioning an at least one alternative gaming machine in the gaming room, the alternative gaming machine being different from that of the prototype gaming machine and having a known success rate, for providing the at least one respondent an alternative machine with which to selectively interact;
positioning an at least one video camera in the gaming room, the at least one video camera configured for capturing the visual behavior of the at least one respondent while the at least one respondent interacts with at least one of the prototype gaming machine and the at least one alternative gaming machine;
positioning an at least one microphone in the gaming room, the at least one microphone configured for capturing the audible behavior of the at least one respondent while the at least one respondent interacts with at least one of the prototype gaming machine and the at least one alternative gaming machine;
implementing a computing device in communication with each of the prototype gaming machine, at least one alternative gaming machine, at least one video camera and at least one microphone, the computing device configured for receiving and processing data related to the prototype gaming machine, the at least one alternative gaming machine and the at least one respondent;
providing each of the at least one respondent with an equal number of play credits to be selectively used in the prototype and alternative gaming machines in lieu of actual money, each of the gaming machines configured for requiring a pre-determined number or range of credits per play and similarly rewarding the at least one respondent with additional credits for wins;
commencing a game play session, during which time the at least one respondent is able to freely and selectively interact with each of the prototype gaming machine and the at least one alternative gaming machine, the game play session to last for a pre-determined period of time;
the computing device receiving the captured visual and audible behavior of the at least one respondent from the at least one video camera and microphone;
the computing device receiving play data from the prototype gaming machine and the at least one alternative gaming machine, said play data including at least one of a number of times each of the at least one respondent plays each of the prototype gaming machine and at least one alternative gaming machine, an amount of time each of the at least one respondent spends playing each of the prototype gaming machine and at least one alternative gaming machine, a number of credits bet by each of the at least one respondent on each of the prototype gaming machine and at least one alternative gaming machine, and a number of credits won by each of the at least one respondent on each of the prototype gaming machine and at least one alternative gaming machine; and
upon the passing of the pre-determined period of time:
concluding the game play session;
calculating the number of credits that were accumulated by each of the at least one respondent during the game play session;
ranking the at least one respondent by number of credits accumulated during the game play session;
awarding prizes to each of the respondents based on their respective rankings;
the computing device obtaining a conscious opinion of the prototype gaming machine from each of the at least one respondent;
the computing device determining an unconscious opinion of the prototype gaming machine from each of the at least one respondent based on at least one of the visual behavior of said at least one respondent, the audible behavior of said at least one respondent, and the play data associated with said at least one respondent; and
the computing device adjusting the conscious opinion of each of the at least one respondent based on the corresponding unconscious opinion of said at least one respondent;
whereby, the method is capable of facilitating the collection of accurate feedback with respect to each of the at least one respondent's opinion of the prototype gaming machine.

11. A system for facilitating the evaluation of a prototype gaming machine by an at least one respondent, the system comprising:
a gaming room configured to resemble a casino floor so as to provide a realistic gaming atmosphere for the at least one respondent, the prototype gaming machine positioned therewithin;
an at least one alternative gaming machine positioned within the gaming room, the alternative gaming machine being different from that of the prototype gaming machine for providing the at least one respondent an alternative machine with which to selectively interact;
an at least one video camera positioned within the gaming room and configured for recording the visual behavior of the at least one respondent while the at least one respondent interacts with at least one of the prototype gaming machine and the at least one alternative gaming machine;
an at least one microphone positioned within the gaming room and configured for recording the audible behavior of the at least one respondent while the at least one respondent interacts with at least one of the prototype gaming machine and the at least one alternative gaming machine; and a computing device in communication with each of the prototype gaming machine, the at least one alternative gaming machine, the at least one video camera, and the at least one microphone, the computing device configured for receiving and processing data related to the prototype gaming machine, the at least one alternative gaming machine and the at least one respondent;

wherein the computing device is configured for:
- providing each of the at least one respondent with an equal number of play credits to be selectively used in the prototype and alternative gaming machines in lieu of actual money, each of the gaming machines configured for requiring a pre-determined number or range of credits per play and similarly rewarding the at least one respondent with additional credits for wins;
- commencing a game play session, during which time the at least one respondent is able to freely and selectively interact with each of the prototype gaming machine and the at least one alternative gaming machine, the game play session to last for a pre-determined period of time;
- receiving the captured visual and audible behavior of the at least one respondent from the at least one video camera and microphone;
- receiving play data from the prototype gaming machine and the at least one alternative gaming machine, said play data including at least one of a number of times each of the at least one respondent plays each of the prototype gaming machine and at least one alternative gaming machine, an amount of time each of the at least one respondent spends playing each of the prototype gaming machine and at least one alternative gaming machine, a number of credits bet by each of the at least one respondent on each of the prototype gaming machine and at least one alternative gaming machine, and a number of credits won by each of the at least one respondent on each of the prototype gaming machine and at least one alternative gaming machine; and
- upon the passing of the pre-determined period of time:
  - concluding the game play session;
  - obtaining a conscious opinion of the prototype gaming machine from each of the at least one respondent;
  - determining an unconscious opinion of the prototype gaming machine from each of the at least one respondent based on at least one of the visual behavior of said at least one respondent, the audible behavior of said at least one respondent, and the play data associated with said at least one respondent; and
  - adjusting the conscious opinion of each of the at least one respondent based on the corresponding unconscious opinion of said at least one respondent;

whereby, the system is capable of simulating a realistic casino environment, thereby facilitating the collection of accurate feedback with respect to each of the at least one respondent's opinion of the prototype gaming machine.

12. The system of claim 11, further comprising an at least one further prototype gaming machine positioned within the gaming room, the number of prototype gaming machines being dependent upon on the number of respondents.

13. The system of claim 11, wherein the at least one alternative gaming machine has a known success rate, either through prior evaluations of the alternative gaming machine or proven success in public use, so as to allow for clearer assessments based on respondent comparisons between the prototype gaming machine and alternative gaming machine.

14. The system of claim 11, wherein the at least one video camera is positioned on the prototype gaming machine for capturing both the respondent's facial expressions as well as the respondent's body language.

15. The system of claim 11, wherein the at least one microphone is positioned on the prototype gaming machine for capturing any audible noises created by the respondent.

16. The system of claim 11, wherein the at least one video camera is positioned on the at least one alternative gaming machine for capturing both the respondent's facial expressions as well as the respondent's body language.

17. The system of claim 11, wherein the at least one microphone is positioned on the at least one alternative gaming machine for capturing any audible noises created by the respondent.

18. The system of claim 11, wherein the computing device is further configured for allowing the at least one respondent to stop playing at any point during the game play session.

19. The system of claim 11, wherein the computing device is further configured for providing the at least one respondent with the option of receiving additional credits upon said at least one respondent losing all of their credits with time still remaining in the game play session.

20. The system of claim 11, wherein upon the passing of the pre-determined period of time, the computing device is further configured for:
- calculating the number of credits that were accumulated by each of the at least one respondent during the game play session;
- ranking the at least one respondent by number of credits accumulated during the game play session; and
- awarding prizes to each of the respondents based on their respective rankings.

* * * * *